United States Patent [19]
Tornquist et al.

[11] Patent Number: 5,610,332
[45] Date of Patent: Mar. 11, 1997

[54] SELF PILOTING BALANCE ARBOR

[75] Inventors: Gerald E. Tornquist, Tempe; Paul E. Hruska, Gilbert, both of Ariz.

[73] Assignee: AlliedSignal Inc., Morris Township, N.J.

[21] Appl. No.: 514,593

[22] Filed: Aug. 14, 1995

[51] Int. Cl.⁶ ................................................. G01M 1/02
[52] U.S. Cl. ................................................ 73/455; 73/487
[58] Field of Search .......................... 73/455, 456, 460, 73/462, 468, 473, 475, 487; 416/144, 145, 244 A

[56] References Cited

U.S. PATENT DOCUMENTS

| | | |
|---|---|---|
| 2,161,740 | 6/1939 | Eksergian . |
| 4,169,630 | 10/1979 | Wagner . |
| 4,618,300 | 10/1986 | Goebel ................................ 73/487 |
| 4,716,761 | 1/1988 | Ito et al. ............................. 73/455 |

OTHER PUBLICATIONS

"Controlling Fastening Reliability and Costs", *Assembly Engineering*, Jan. 73, pp. 26–30.

*Primary Examiner*—John E. Charman
*Attorney, Agent, or Firm*—Jerry J. Holden; James W. McFarland

[57] ABSTRACT

A self piloting balance arbor for use in the dynamic balancing of gas turbine engine components having shafts extending therefrom. The arbor includes a cylindrical sleeve for receiving the shaft, and an annular flange at one end. A conical compliant member extends axially and radially inward from the flange to an end portion having two flat surfaces perpendicular to each other. Upon the application of a load to the arbor the two flat surfaces come into contact with the component, thereby correctly positioning the arbor relative to the component.

8 Claims, 2 Drawing Sheets

SELF PILOTING BALANCE ARBOR

TECHNICAL FIELD

The present invention relates generally to arbors, and in particular to an arbor used in balancing the rotating components of gas turbine engines.

BACKGROUND OF THE INVENTION

Gas turbine engines include rotating compressor and turbine wheels. FIG. 1 shows a typical turbine wheel 1 comprising a disk 2 mounted to a shaft 3 which is known as a tieshaft. The disk 2 and shaft 3 are symmetric about the axial centerline 4 of the engine. The amount of unbalance of the wheel is defined by the radial eccentricity of its mass center-of-gravity relative to its geometric centerline. This unbalance, if not controlled, will cause the wheel and shaft to vibrate when rotating inside the engine. To avoid this situation each wheel is balanced before being mounted in the engine. Balancing is accomplished by mounting the wheel on a balance machine that has two rotating mounts, spinning the wheel, and removing material from the wheel until the unbalance comes within allowable limits.

The mounting of the wheel on the balance machine can take various forms, depending upon the configuration of the wheel being mounted, and on available fixturing. In some cases it may be satisfactory to mount the wheel directly on the balance machine. In other cases it may be necessary to create an assembly, consisting of the wheel and other custom made parts, in order to achieve satisfactory results. Generally, it is desirable to mount the wheel on the balance machine in a manner as similar as practical to the way in which the wheel is mounted in the engine. The more the balance machine mounting configuration differs from the actual engine mounting, the more uncertainty is introduced into the balancing process. Inadequate control over the balancing process can ultimately result in costly engine rejections prompted by unacceptable engine vibration levels.

The best possible configuration is one in which the wheel can be directly mounted on the balance machine utilizing the bearing surfaces that support the wheel in the engine. However, often the bearing surfaces that support the wheel in the engine are not on the wheel, or on any components integral with the wheel. In that case, the wheel must be mounted on the balance machine using alternative cylindrically machined surfaces that already exist on the wheel.

Mounting a wheel on these alternative machined surfaces introduces uncertainty in the measured wheel unbalance. The unbalance signal, fed into the balance machine through its rotating mounts, is sensitive to the locations at which the wheel is supported. When the wheel is mounted at different bearing locations than those in the engine, uncertainty is introduced because the balance machine is not capable of accounting for this difference when processing the unbalance input. Further, inaccurate machining of these alternative surface introduces additional uncertainty.

Additional problems occur when the tieshaft is attached to with the disk. In an engine assembly, the tieshaft acts as a through bolt, clamping together engine components that are stacked over the tieshaft. A loaded assembly is created by installing a nut onto the threaded end of the tieshaft, and tightening the nut against the stacked components, thereby loading the tieshaft in tension and the stacked components in compression. The tensile loading on the tieshaft in the assembly acts to straighten out tieshaft curvature, thereby reducing engine unbalance. However, wheels often must be mounted directly on a dynamic balance machine, without the tieshaft straightening benefit of a loaded assembly.

Referring again to FIG. 1, a typical configuration of this type would have the wheel 1 rotatably supported at alternative bearing locations 5 and 6, leaving the tieshaft 3 unsupported. Although uncertainty is reduced because the number of parts being balanced is minimized, this benefit may be more than offset due to the effect of the alternative mount points 5 and 6, combined with a tail wagging effect from the unsupported tieshaft 3. The tail wagging effect can cause amplification of unbalance loads from tieshaft curvature that is not present in the loaded assembly of the engine. As a result, balancing wheels in this way often results in excessive engine vibration.

One approach to improving the balancing of wheels with integral tieshafts is to create a loaded assembly similar to an engine assembly. One such assembly is illustrated in FIG. 1. The components, that in the engine comprise the compressed stack-up, are here simulated by a long sleeve known as a balance arbor 7. It is then the balance arbor 7 that is compressed against disk 2 upon assembly. On the exterior of arbor 7 are machined surfaces 8 that correspond in size and location to the bearing surfaces that support the wheel in an engine. By utilizing machined surfaces 8 for mounting on the balance machine, uncertainty due to bearing location and machining inaccuracy is thereby minimized. Uncertainty is further reduced because the tieshaft 3 is loaded in tension as in the engine assembly, thus acting to straighten any curvature in the tieshaft. Also, by applying the same tieshaft load as used in the engine assembly, any unbalance created by remaining curvature will be the same on the balance machine as in the engine.

Although an assembly like that shown in FIG. 1 solves the mounting configuration problems associated with mounting the wheel alone on the balance machine, uncertainty is increased by the fact that additional parts are required. Referring again to FIG. 1, the balance arbor 7 is radially positioned relative to the wheel 1 by an overlapping radial fit of the arbor to a machined surface of the disk. Due to a combination of machining inaccuracy, and a need to re-use the balance arbor, there is inevitably some looseness in the assembly resulting in lack of control over the radial positioning of the wheel relative to the arbor. Thus, uncertainty is introduced because the relative radial position of the wheel is not completely controlled, either from one assembly to the next, or from the balance machine to the engine.

Accordingly, a need exists for a balance arbor that can simulate the mounting configuration and loading conditions present in the engine, while minimizing uncertainty in the unbalance measurements due to looseness of the assembly.

SUMMARY OF THE INVENTION

An object of the invention is to provide a tool for mounting a turbine wheel with an extending shaft on a dynamic balancing machine, such that looseness of the tool relative to the wheel is eliminated.

Another object of the present invention is to provide a tool which allows for a mounting configuration on a dynamic balancing machine where the wheel is supported much the same way as in an engine.

The present invention achieves the above mentioned objects by first providing an arbor that positively positions itself upon assembly with a turbine wheel. More particularly, the arbor is composed of a cylindrical sleeve for receiving the shaft of a turbine wheel, the sleeve having at one end a radially extending annular flange from which a conical shaped compliant member extends axially and radially. The end of the compliant member has an axially facing flat surfaces for abutting the turbine wheel, and a radially inward facing surface sized to circumscribe, and be slightly radially spaced apart from, a radially facing pilot surface extending from the disk of the turbine wheel. Upon assembly the arbor is axially compressed between a nut fitted to threads on the tieshaft at one end, and the disk at the other end, causing the end of the compliant member to deflect inward and come into contact with the radially facing disk pilot surface, thereby eliminating looseness in the assembly.

The present invention further achieves the above mentioned objects by providing an arbor with machined surfaces for mounting on a balance machine, that are selected to correspond in location and size as closely as practical to the machined surfaces that support the turbine wheel in an engine.

DESCRIPTION OF THE PREFERRED EMBODIMENT

Figure 1:
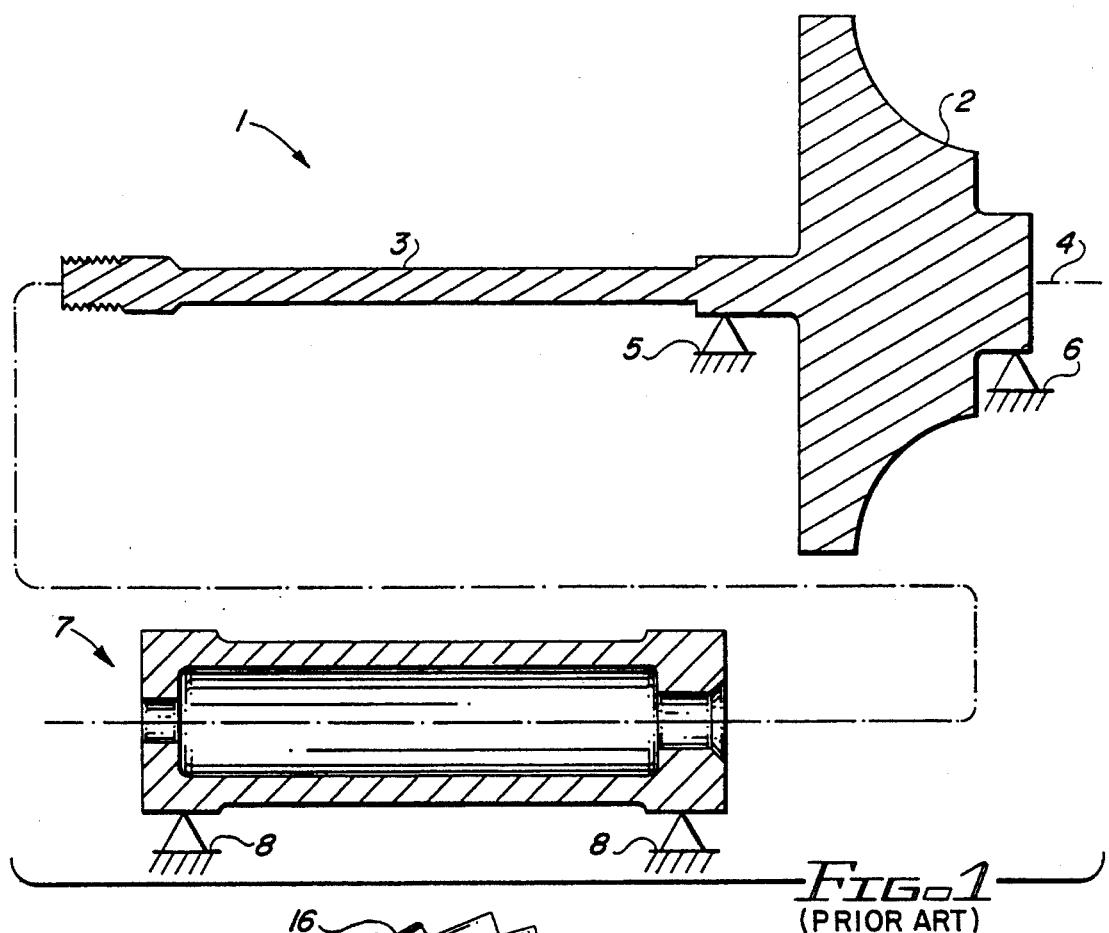
FIG. 1 is a cross-sectional view of a turbine wheel balance assembly having a prior art balance arbor.
Figure 2:
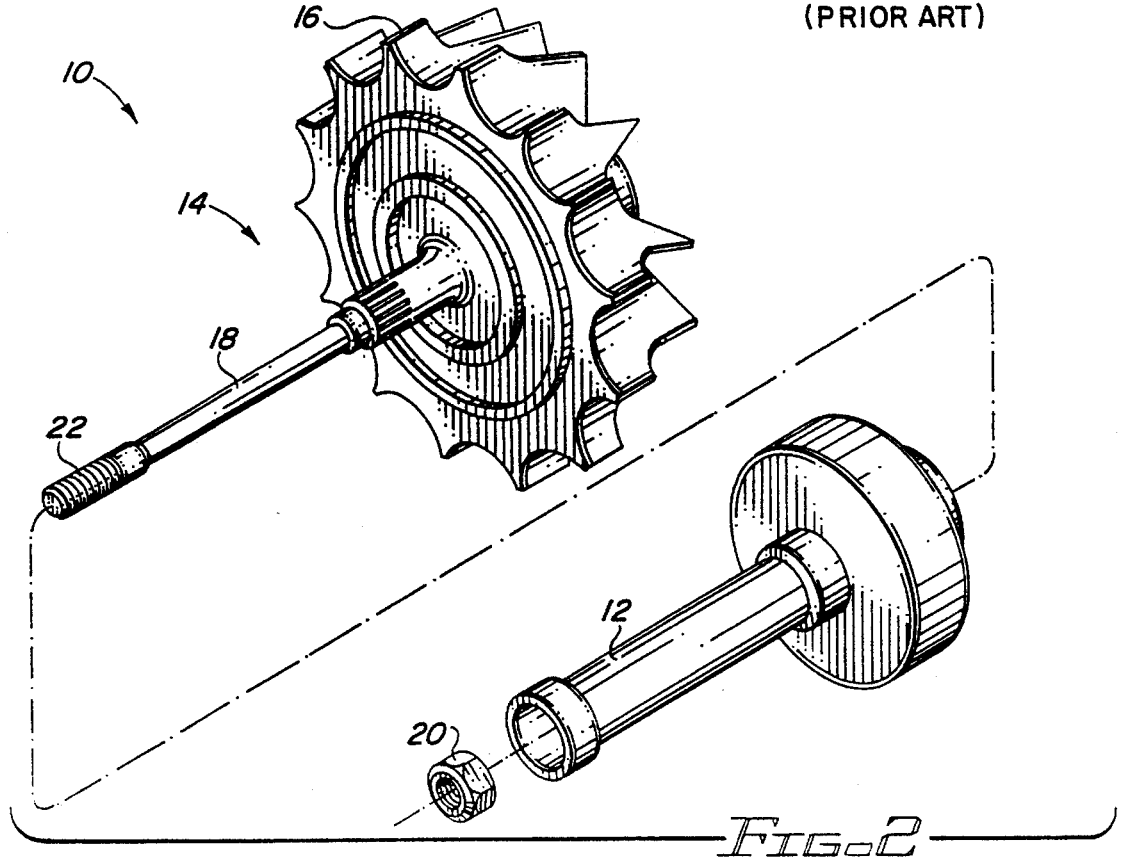
FIG. 2 is an exploded view of a turbine wheel balance assembly having a self piloting balance arbor contemplated by the present invention.

Referring to FIG. 2, a turbine wheel balance assembly 10 includes a self piloting arbor 12, a turbine wheel 14 consisting of a disk 16 integral with a tieshaft 18, and a nut 20 fitted to the threads 22. By torquing down the nut 18, or alternatively by simultaneously pulling on the tieshaft 18 and pushing on the self piloting arbor 12 while securing the nut 20, a predetermined load is applied that forces the arbor 12 against the wheel 14. As a result, the arbor 12 is placed in axial compression, and the tieshaft 18 is placed in axial tension.

Figure 3:
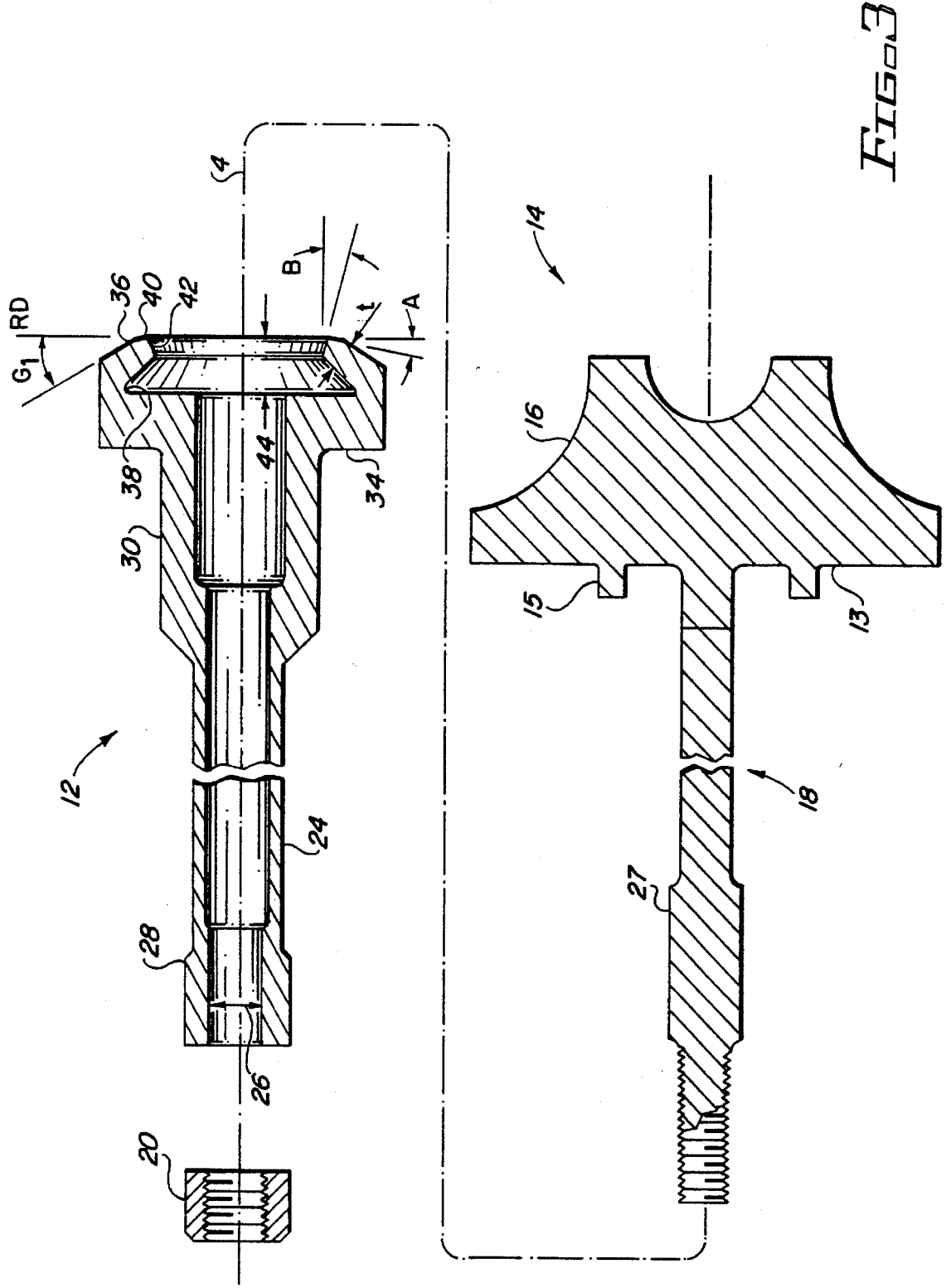
FIG. 3 is an exploded, cross sectional view of the turbine wheel balance assembly of FIG. 2.

Referring now to FIG. 3, the arbor 12 is comprised of a cylindrical sleeve 24 with a machined inner diameter 26 sized to radially pilot the arbor 12 to the machined bearing surface 27 of the tieshaft 18. Mount locations 28 and 30 are machined into the outer surface of the cylindrical sleeve 24. The location and dimensions of the surfaces 28 and 30 are selected to correspond, as close as practical, to the location and dimensions of the bearing surfaces that support the wheel 14 when mounted in an engine.

At one end of the cylindrical sleeve 24 and integral therewith, is an outward extending annular flange 34. From the outer end of the flange 34, a conically shaped, annular compliant member 36 extends axially and radially inward toward the centerline 4 so as to define a circumferential channel 38. The compliant member 36 has an axially facing flat end surface 40 at its radially inner end for abutting disk 16 at face 13 and applying the compressive force thereon. When the arbor 12 is compressively loaded, the compliant member 36 acts as a spring and deflects axially and radially inward. In the preferred embodiment, the thickness t of the compliant member 36 is approximately ⅓ of its axial extension as shown by arrows 44. This ratio of thickness to axial extension provides sufficient stiffness to compliant member 36 so it can apply the compressive force desired, without excessive radial deflection that can result in gouging of the disk 16.

The compliant member 36 also has a radially facing inner surface 42 that encircles a radially facing outer surface 15 of disk 16, subsequently referred to herein as the disk radial pilot surface 15, with little or no clearance therebetween prior to application of a load. In the preferred embodiment, the inner surface 42 is sized with a line to line clearance with the disk radial pilot surface 15. However, a greater compliance in the compliant member 36 would require greater clearance between the inner surface 42 and the disk radial pilot surface 15 to prevent gouging. When the arbor is compressively loaded, the inner surface 42 deflects radially inward to contact the disk radial pilot surface 15. By clamping the inner surface 42 onto the disk radial pilot 15, balance measurement uncertainty resulting from looseness in the assembly is thereby removed.

Still referencing FIG. 3, the conical angle C1 in the preferred embodiment is approximately 35 degrees from the radial direction RD which is perpendicular to the arbor and engine centerline. As one skilled in the art can appreciate, as the angle C1 approaches 90 degrees, the axial stiffness of the compliant member 36 increases and as the angle approaches 0 degrees, the axial stiffness of the compliant member 36 decreases, as long as the compliant member 36 is spaced axially apart from the flange 34. Conversely, as angle C1 approaches 0 degrees, radial stiffness increases so that the radial force through the inner surface 42 to pilot the arbor 12 becomes increasingly large. Thus, angle C1 must be less than 90 degrees and is preferably between about 45 degrees and 0 degrees.

Preferably, flat end surface 40 has a slight angle A as shown in FIG. 3 that is less than about 1 degree. The angle A allows the surface 40 to align flat against the disk axial face 13 when the arbor 12 is compressed. Similarly, inner surface 42 has a slight angle B that is less than about 1 degree so that the surface 42 will lay flat against the disk radial pilot 15 when the arbor 12 is compressed. Both angles A and B should be changed inversely proportionally to changes in the stiffness of the compliant member 36.

The self piloting arbor 12 is preferably made from high strength steel with dimensionally stable properties, and manufactured by bottle boring such that material is removed between the flange 34 and the compliant member 36 creating the annular channel 38 therebetween. However, alternative processes are available, such as casting an integral arbor 12, or bonding a compliant member 36 to the flange 34.

In an alternative embodiment, the compliant member 36 extends radially outward from the flange 34 and radially contacts an inner radial pilot surface of the disk 16. This configuration would provide the desired axial compliance while piloting the arbor 12 to the disk 16, and provide for tieshaft curvature screening in essentially the same way as the preferred embodiment.

Other modifications and alterations to the above described preferred embodiment will be apparent to those skilled in the art. Accordingly, this description of the invention should be considered exemplary in nature and not as limiting to the scope and spirit of the invention which should be determined from the following claims.

What is claimed is:

1. A self piloting arbor for mounting a gas turbine component having a shaft extending therefrom, and defining an axial direction, comprising:

a cylindrical sleeve for receiving said shaft, said sleeve having an annular flange at one end; and a conical shaped compliant member extending from said flange to an end portion having an axially facing first flat surface for abutting said component.

2. The arbor of claim 1 wherein said end portion has a second radially facing flat surface for contacting a radial pilot surface on said component.

3. The arbor of claim 2 wherein said compliant member extends inward from said flange.

4. The arbor of claim 3 wherein said compliant member extends at an angle of approximately 35 degrees from a radial direction.

5. The arbor of claim 4 wherein said first flat surface is angled at less than about one degree.

6. The arbor of claim 4 wherein said second flat surface is angled at less than about one degree.

7. An arbor for receiving a shaft extending from a rotating gas turbine component, comprising:

means for receiving an axially compressive load on a first end of said arbor;

a cylindrical portion for transferring the axially compressive load from said first end to a second end of said arbor;

means at the second end for radially clamping onto said rotating gas turbine engine component in response to said axially compressive load, wherein said clamping means includes an annular flange having a compliant member extending therefrom; and wherein said compliant member has a conical shape and extends inward from said annular flange to an end portion having an axially facing first flat surface for abutting said rotating gas turbine engine component.

8. The arbor of claim 7 wherein said end portion has a second radially facing flat surface for radially clamping onto a radial pilot surface on said rotating gas turbine component.

* * * * *